J. K. GRIFFITH.
ART OF CASTING.
APPLICATION FILED JULY 11, 1916. RENEWED DEC. 19, 1918.
1,313,593.
Patented Aug. 19, 1919.
7 SHEETS—SHEET 7.
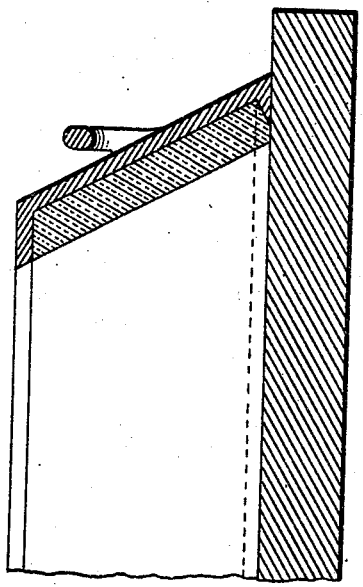
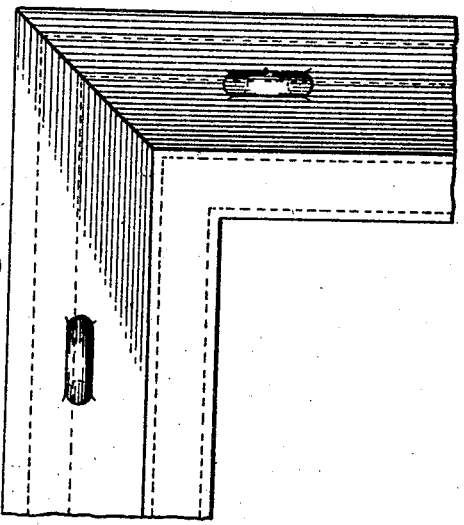
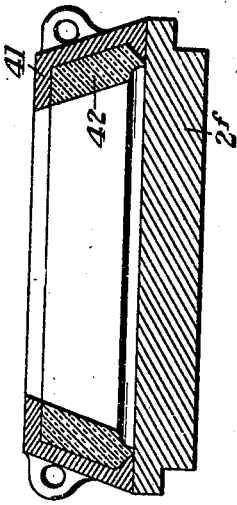
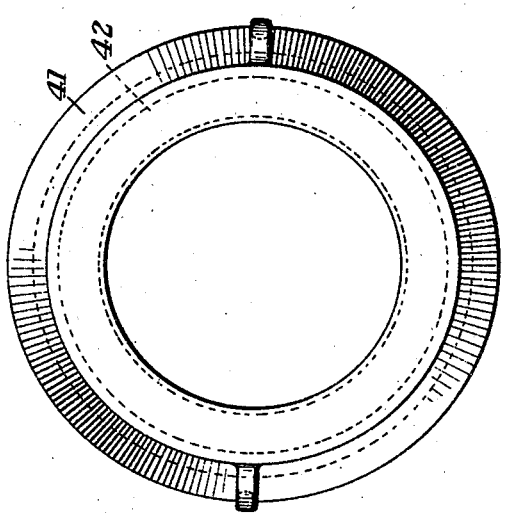
WITNESSES
INVENTOR

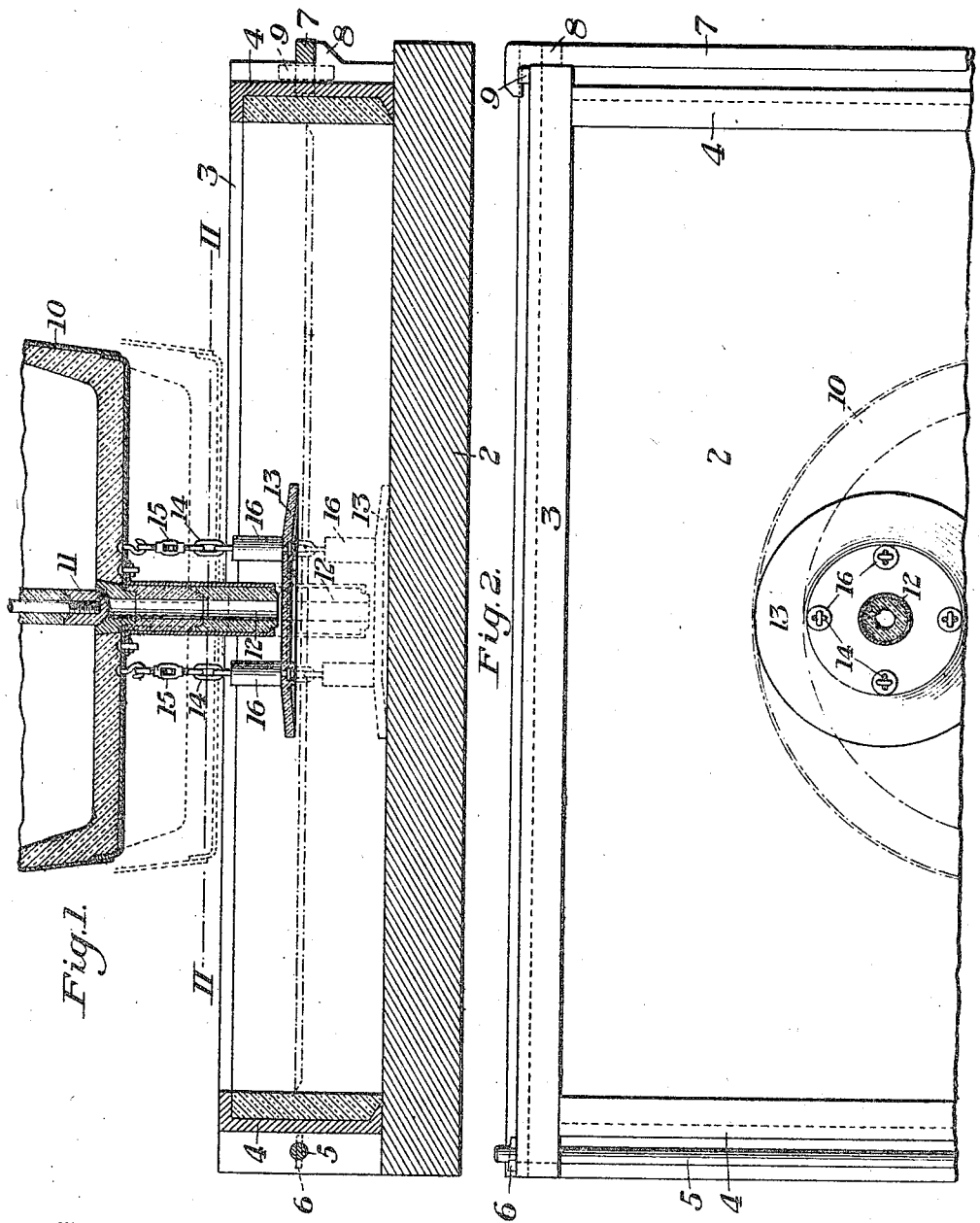

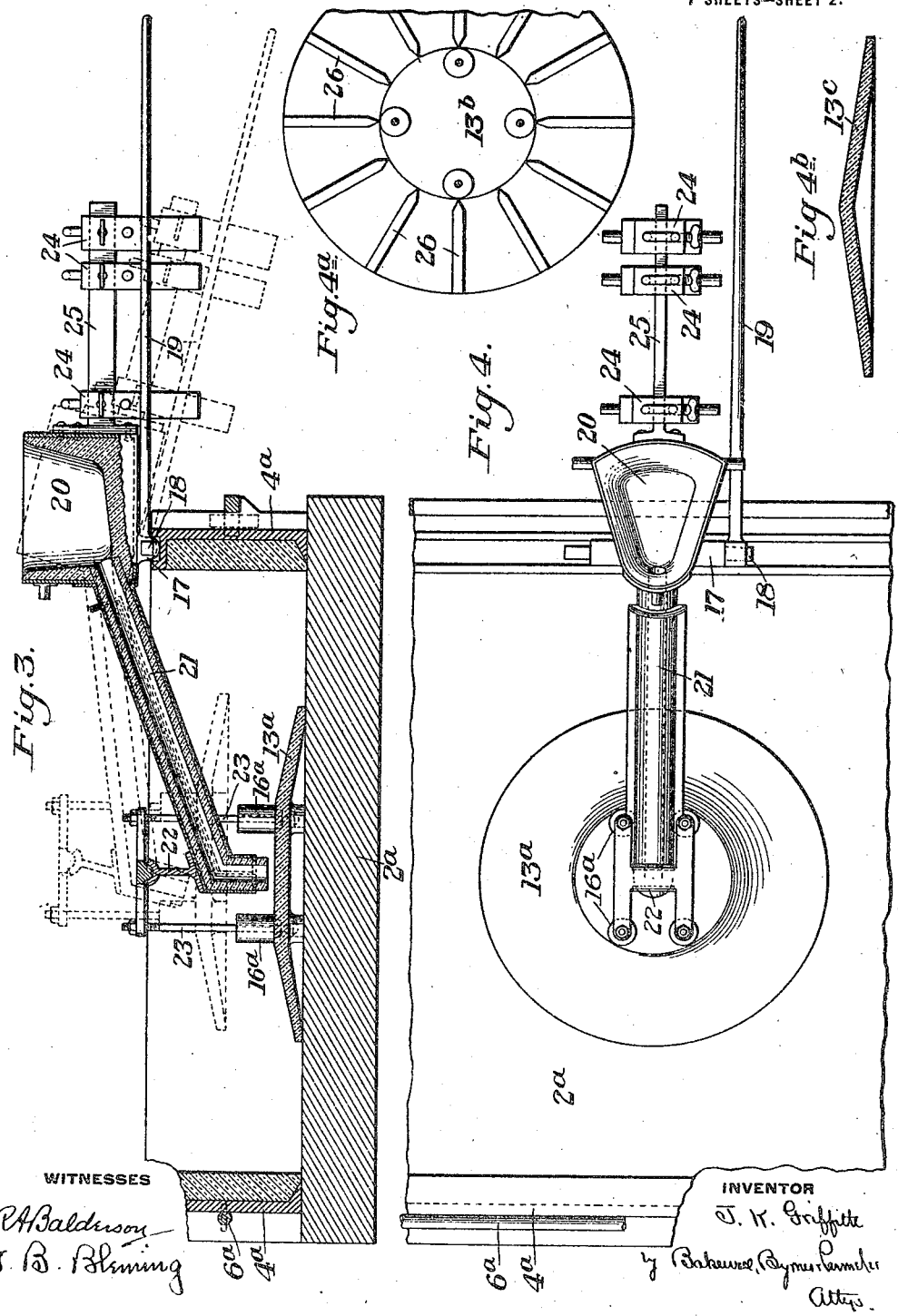

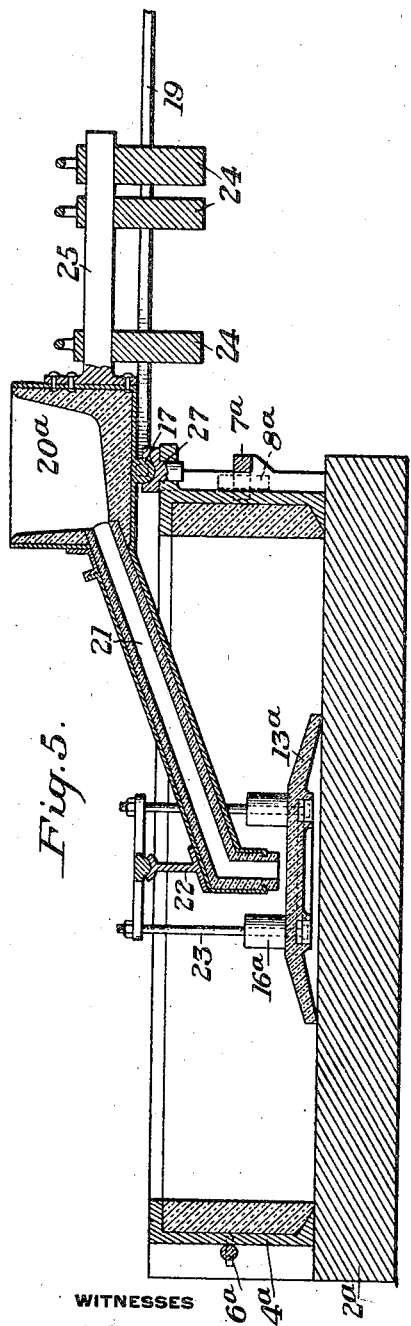
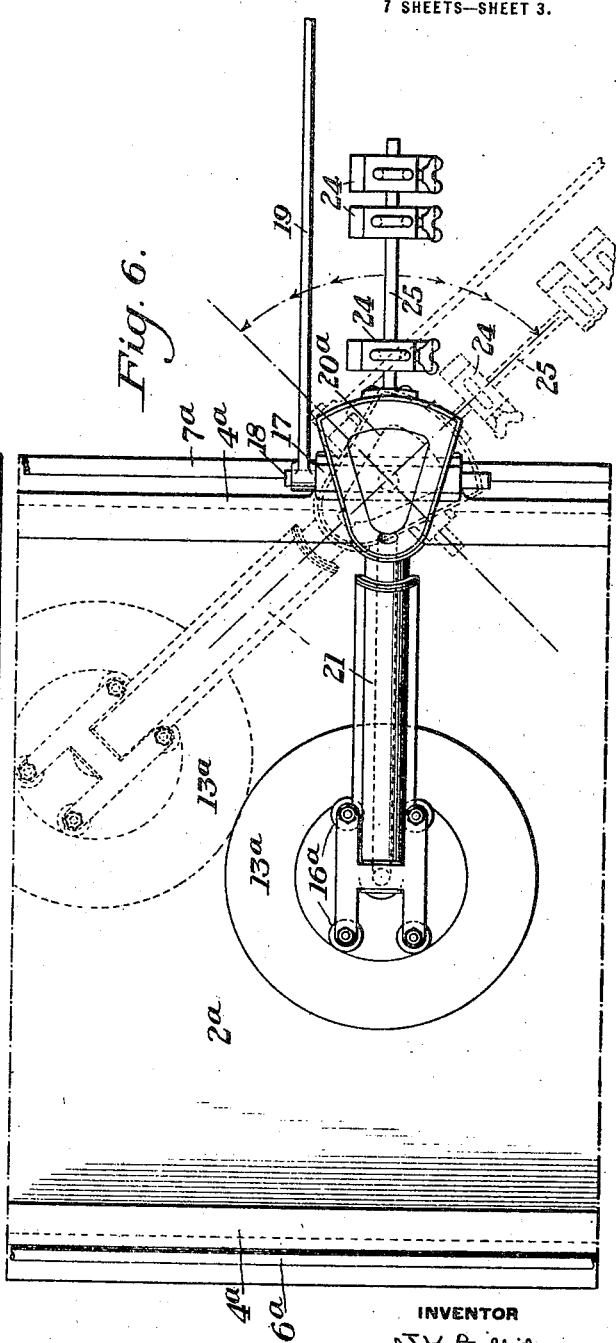

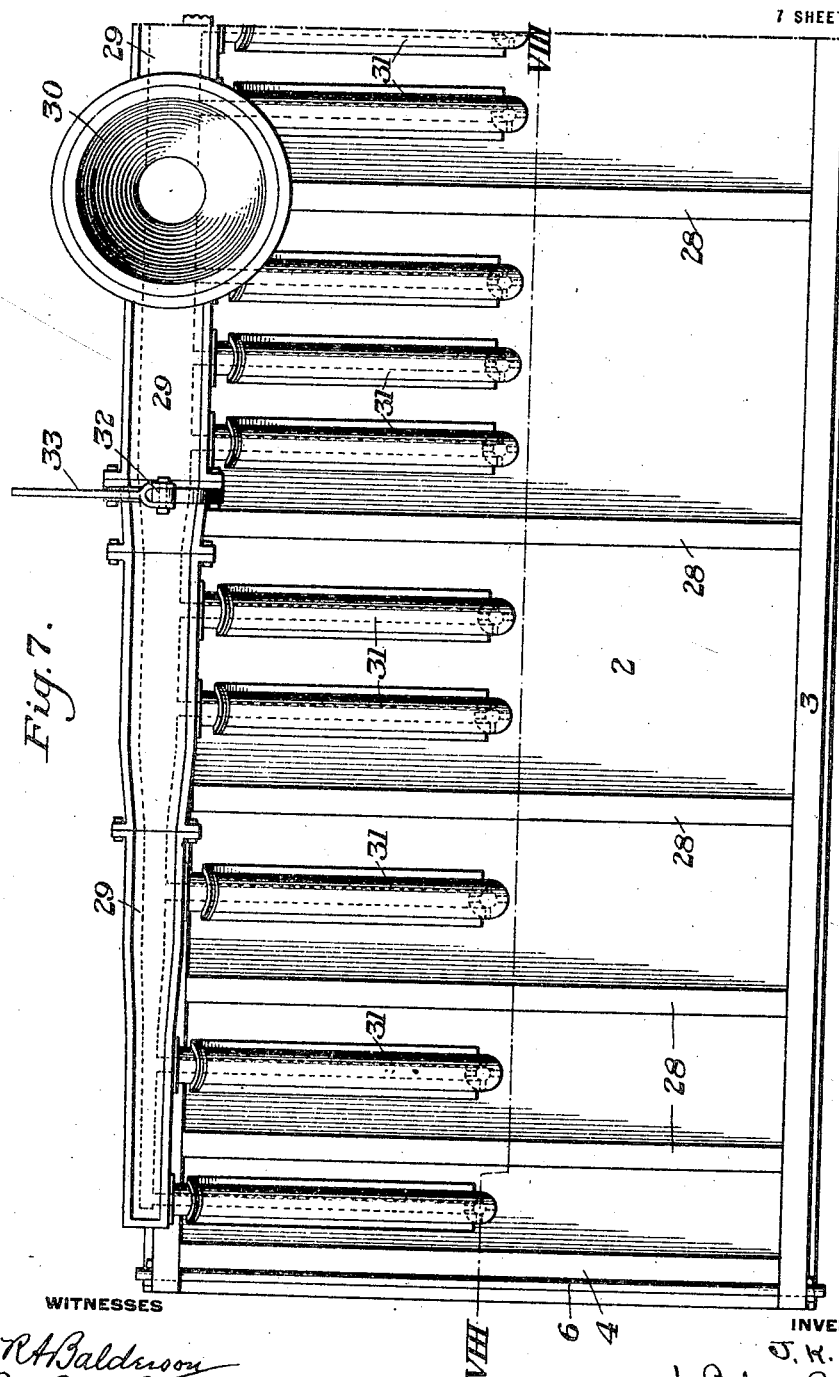

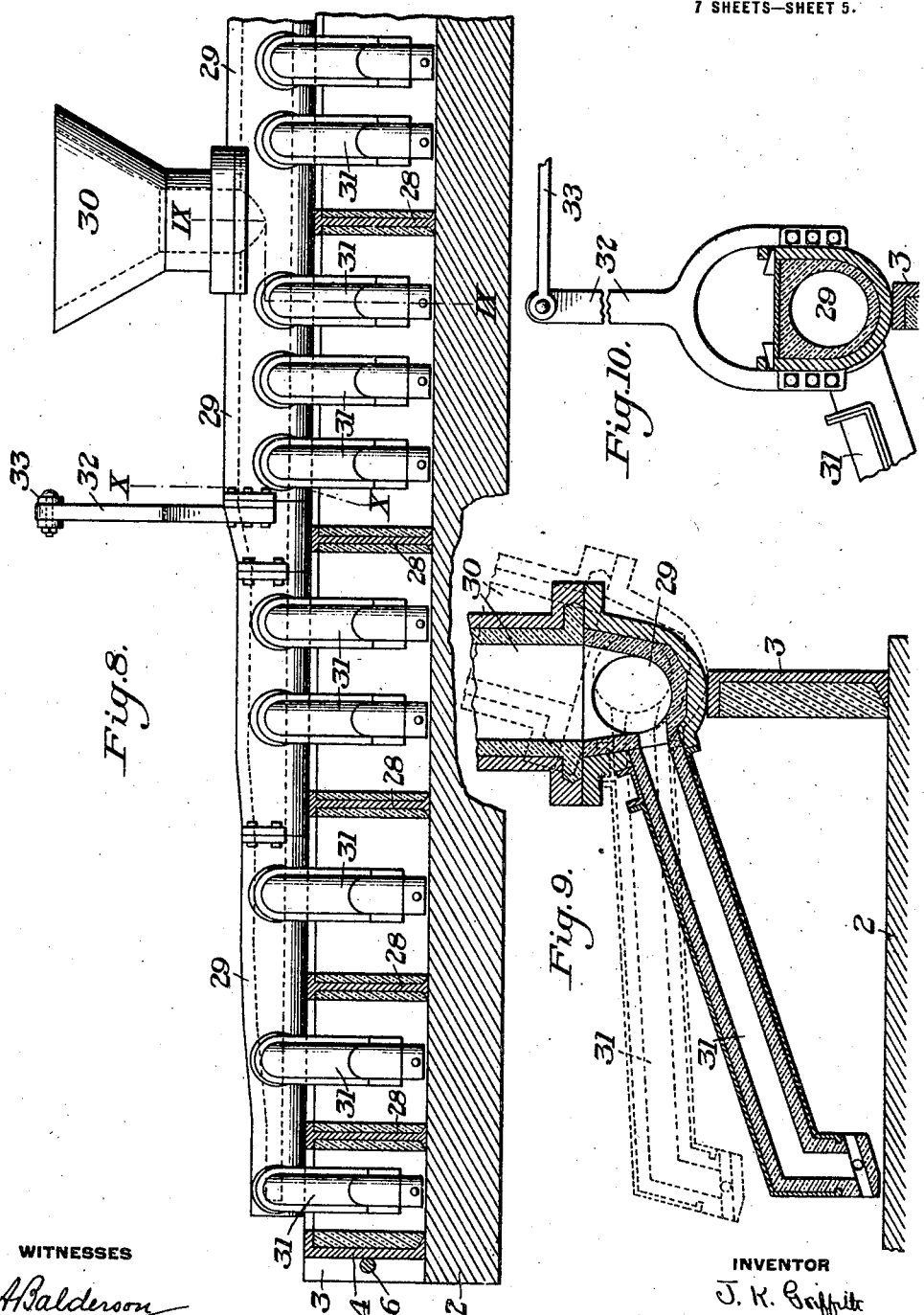

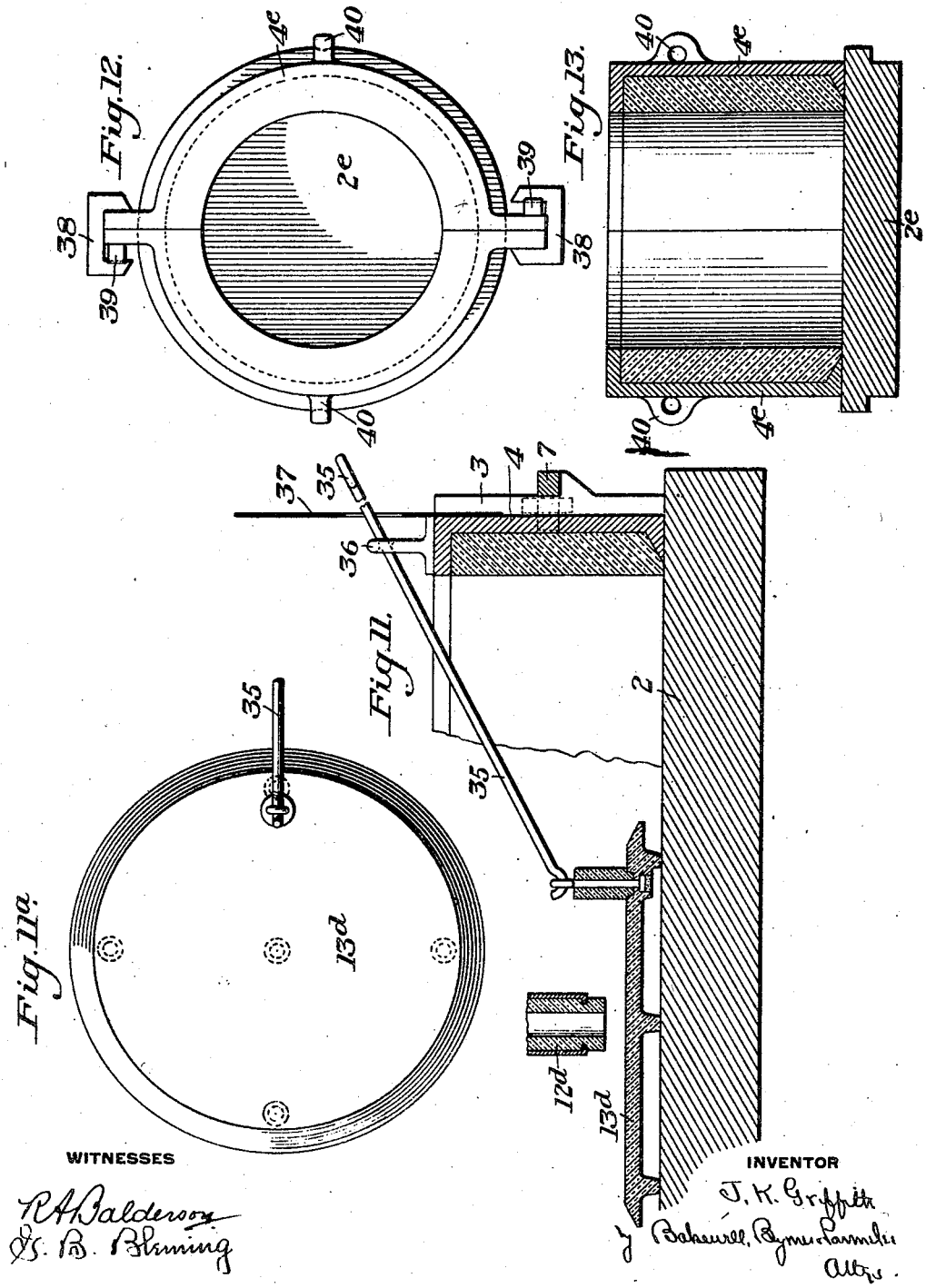

UNITED STATES PATENT OFFICE.

JACOB K. GRIFFITH, OF PITTSTON, PENNSYLVANIA, ASSIGNOR TO A. J. GRIFFITH, OF PITTSTON, PENNSYLVANIA.

ART OF CASTING.

1,313,593. Specification of Letters Patent. Patented Aug. 19, 1919.

Application filed July 11, 1916, Serial No. 108,562. Renewed December 19, 1918. Serial No. 267,537.

*To all whom it may concern:*

Be it known that I, JACOB K. GRIFFITH, a citizen of the United States, residing at Pittston, in the county of Luzerne and State of Pennsylvania, have invented a new and useful Improvement in the Art of Casting, of which the following is a full, clear, and exact description, reference being had to the accompanying drawings, forming part of this specification, in which:

Figure 1 is a vertical section showing one form of apparatus for carrying out my invention;

Fig. 2 is a partial section on the line II—II of Fig. 1;

Fig. 3 is a vertical section showing another form of apparatus for carrying out my invention;

Fig. 4 is a partial plan view of Fig. 3;

Figs. 4ª and 4ᵇ are modified forms of spreader plates;

Figs. 5 and 6 are views similar to Figs. 3 and 4, showing another form of the pouring device;

Fig. 7 is a top plan view showing another form of pouring system for carrying out my invention;

Fig. 8 is a section on the line VIII—VIII of Fig. 7;

Fig. 9 is a cross section of Fig. 7;

Fig. 10 is a detail view of the same;

Fig. 11 is a partial vertical section showing a form of floating spreader plate;

Fig. 11ª is a plan view of the plate shown in Fig. 11;

Fig. 12 is a plan view of a circular form of mold;

Fig. 13 is a vertical section of the form of Fig. 12;

Fig. 14 is a vertical section showing a pouring blank mold constructed in accordance with my invention;

Fig. 15 is a top plan view of Fig. 14;

Fig. 16 is a partial vertical section showing another form of square rectangular mold; and Fig. 17 is a plan view of the corner portion of Fig. 16.

My invention relates to the casting method set forth in my Patent No. 618,867, dated February 7, 1899, for art of casting and apparatus therefor, and is designed to provide certain improvements thereon. These improvements consist in the following features:

1st. The use of a steel bottom chill plate instead of a cast iron plate;

2nd. In providing for rapid removal of the mold sides either by using a collapsible mold or by using a mold having sides so tapered or shaped that it will provide for quick and ready removal from the cast blank;

3d. In a feeding system designed to more thoroughly and uniformly spread the metal into successive layers over the chill bottom and within the mold; and 4th. In the use of a spreader plate to assist in carrying out the spreading of the metal within the mold without danger of welding to the top of the bottom chill.

It also consists in certain other features hereinafter more fully described and claimed.

As set forth in my Patent No. 618,867, the abstraction of heat from the bottom of cast steel blanks or ingots more rapidly than from the sides removes the troubles of segregation and piping, inasmuch as the metal chills in successive layers, one above the other, owing to the rapid chilling or freezing effect of the bottom plate. The cast iron plate, however, which it was proposed to use with the system of my said patent is liable to weld to the cast steel, and in accordance with my present invention, I use a heavy steel bottom plate which is of great advantage for two reasons: First, because its melting point is far above that of cast iron (from 1000° to 1200° F.); and second, because its heat conductivity is 10% or more greater than that of cast iron. Consequently, there is much less danger of the cast steel welding to the bottom, and furthermore, the chilling is more effectively carried out.

Furthermore, the pouring molds with side gates or a vertically movable ladle, as set forth in said patent, have practical disadvantages, and these are largely overcome according to my present invention by using a system for more thoroughly distributing the metal in streams over the surface of the bottom chill. In addition, difficulty is experienced in the system of my said patent, owing to the fact that the ordinary solid mold cannot be quickly and readily removed from the casting.

In the preferred form of my present invention, I propose to remove the mold as soon as the casting has set sufficiently, and then shear the cast ingot into blooms or billets, thereby doing away with blooming mills or mills for reducing the ingot prior to its being sheared. As to this feature of my invention, the ordinary ingot molds will be done away with, as well as blooming mills. Furthermore, in carrying out my invention, all scrap is practically done away with, as there is no piping. Of course, there will be shrinkage at the top of my ingot, but not what is known in this art as "piping."

Referring now to the forms of Figs. 1 and 2, 2 represents a heavy steel plate forming the base of a mold of much greater width than depth, this acting as the bottom chill of the mold. On this steel bottom are set the collapsible sides of the mold, these being shown as formed of separate side plates 3 and end plates 4, these being preferably lined with non-heat-conducting refractory material, as shown. The lower flanges of these plates are preferably tapered downwardly and inwardly so that the refractory lining will extend down to the bottom chill. These sides may be removably held in place by any desired system. In the form shown, the end plates extend between the side plates and are held in place by cross rods 5, at one end having keys 6, or by hook-shaped rods 7, resting on lugs 8, and provided with movable wedges 9, as shown at the right-hand of Fig. 2.

In these figures, 10 represents a bottom-pour ladle having the usual stopper 11 and a depending nozzle 12 below which is suspended a disk-shaped refractory spreader plate 13. In the form shown, this spreader plate is suspended by chains 14, having adjustable turn buckles 15, hooked to the bottom of the ladle, refractory sleeves 16 being provided for the lower portions of the chains. This disk is preferably concentric with the nozzle 12, so that the metal pouring down upon it when the stopper is raised will be spread uniformly in all directions over the bottom chill plate of the mold.

In Figs. 3 and 4, I show a mold similar to that of Figs. 1 and 2, but provided with a different pouring system. In this case, one end plate 4$^a$ of the mold is provided with a suitable rest for a trunnion 17, having squared ends 18, which may be engaged by a square hole in a handle lever 19. Secured to this trunnion is a pouring pot or basin 20, into which the metal is poured from any suitable ladle. From this pouring basin extends an inclined runner 21, having a support 22 having trunnioned thereon depending links 23, carrying the spreader plate 13$^a$ on links having refractory sleeves 16$^a$. The weight of the spout or runner and spreader plate and supports may be counterbalanced by counterbalance weights 24, adjustable along an outwardly projecting lever arm 25. By this arrangement, the operator may tilt the pouring arrangement, as indicated in full and dotted lines, as the metal rises in the mold.

Instead of the plain spreader plate of Figs. 1 and 3, I may use a spreader plate with radial raised ribs 26, as shown in Fig. 4$^a$, or I may use a plain conical spreader plate 13$^c$, as shown in Fig. 4$^b$.

In Figs. 5 and 6, I show a pouring system similar to that of Figs. 3 and 4, except that the basin 20$^a$ is swiveled to the trunnion so that the operator may turn the system sidewise as well as tilt it vertically. This swiveled connection is shown at 27. This will enable the operator to constantly change the point at which the metal drops upon the top of the chill, without moving the ladle.

In Figs. 7 to 10, I show another pouring system by which the metal may be spread uniformly and evenly over the bottom chills of several molds or several compartments of a single mold. In this case, the mold may be made up the same as in Figs. 1 and 2, except that intermediate transverse partitions 28 are provided to separate the mold into a series of compartments, each of which preferably has a central metallic webb with refractory facings on both sides. In these figures, 29 represents a long inclosed runner, which preferably extends in both directions from the pouring basin 30 and is tapered from the pouring basin toward its ends. From this runner extend the laterally inclosed and refractory-lined runners 31, each of which preferably terminates in a downwardly directed nozzle portion having a bottom closure with side openings. One or more of these branch runners may be provided for each compartment as found desirable. The main runner 29 is mounted to rock on the side of the mold and it may be tilted into different positions by the upwardly projecting lever arm 32, having a link 33, extending to a screw and hand wheel device (not shown), by which the branch runners may be tilted into different positions by being lifted gradually as the metal rises in the mold or mold compartments.

Instead of gradually raising the spreader plate as the metal rises in the mold, I may employ a floating spreader plate which will be lifted by the metal itself as it rises within the mold. In Figs. 11 and 11$^a$, I show such a refractory plate 13$^d$, 12$^d$, representing the pouring nozzle from the ladle. In this case, I preferably provide a hand rod 35, extending through a guide 36 on the side or end of the mold, and thence through a s een 37 by which the spreader plate may be drawn or pushed into different positions, as desired.

In Figs. 12 and 13, I show a circular mold embodying my invention and especially designed for the casting of cylindrical ingots for miscellaneous forgings. In this case, the steel bottom chill is marked 2$^e$ and the mold halves 4$^e$. 38 represents the holding clips, and 39 the wedges for the meeting flanges of the two halves. 40 represents the lifting lugs.

Instead of using the collapsible mold, in order to utilize the initial heat of the blank for further operations, I may use a quickly detachable mold, which may be readily separated and lifted away from the casting. Thus, in Figs. 14 and 15, I show a solid mold 41, which tapers upwardly and inwardly and is provided with a refractory lining 42, the lining being shaped in this case to form a tire blank for making steel locomotive tires, which may be cored in the center, if desired. In this case, 2$^f$ represents the steel bottom chill. It is evident that on lifting the mold away from the chill, it will immediately separate from the casting, owing to its tapered internal shape.

The same principle may be applied to rectangular or square castings, as shown in Figs. 16 and 17, where I illustrate portions of a square rectangular mold instead of a circular mold, as in Figs. 14 and 15. This may be used for making certain forms of armor plate, particularly those having beveled edges.

The refractory lining of the mold sides is formed of refractory material having as low heat conductivity as possible, inasmuch as I wish the heat to be abstracted as fully as possible through the mold bottom. For this purpose, therefore, I prefer to use a fireclay composition. I may use other refractory material than fireclay, but in all cases, prefer to use a material having a heat conductivity as much slower or less than that of the molten metal as possible.

When the steel is poured into my molds, it is spread over the bottom chill and chills or sets in successive layers, each layer conducting the heat from the next layer above down through the mold bottom or chill. Of course, when I speak of layers, I do not mean that the metal is actually laminated, but I am referring only to decremental layers; that is, the freezing of the molten steel progesses from the bottom upward through successive portions in lines parallel with the bottom. The shrinkage of molten steel is about four per cent. of its cubical contents, and by this progressive freezing from the bottom upward, I prevent the formation of a top central pipe in the casting, the shrinkage occurring over the entire top surface of the ingot, there is consequently little or no loss or waste metal at the top of the ingot.

To effectuate this more thoroughly, I prefer to employ in the mold on the surface of the molten metal, a floating layer of a superheated non-heat-conducting molten material, such as glass or material of a similar nature, and in some cases, I may preserve the fluidity of this floating glass or slag-like layer by covering it with charcoal, ground coke or anthracite coal. This also further insures the progressive solidification of the casting from the bottom by keeping the top fluid until the solidification has reached the upper layer.

As set forth in my Patent No. 618,867, this method readily lends itself to the manufacture of ingots and armor plate having successive portions of different compositions. For example, with my improved system, an armor plate may be cast with say four or five inches of manganese steel, and when this has solidified to within a fraction of an inch of the upper surface, I then introduce on top of it steel of any desired composition to form a plate of any desired thickness, this uniting with the fluid manganese steel.

In case a large ingot is made in a rectangular mold, in accordance with my invention, the sides of the mold may be knocked down or collapsed or the tapered solid mold may be quickly removed as soon as the casting has properly solidified, and the ingot or plate is then taken to shears and sheared into billets, slabs or other desirable forms, preparatory to further work thereon. I am thus enabled to do away with the ordinary ingot molds, and also with the blooming mills necessary to reduce ordinary ingots to a size proper for further work thereon, the shearing being accomplished with the initial heat of the casting plate or ingot.

The invention may be used for the manufacture of armor plate, blanks for rails, tires, circular shapes or for miscellaneous forgings, as well as for shearing into billets or slabs. The superimposed non-metallic floating layer is preferably superheated to a temperature above that of the molten steel and this may be carried out in an electric furnace, if desired.

The advantages of my invention will be obvious to those skilled in the art, since it eliminates piping or shrinkage cavities, reduces or eliminates segregation, does away with the need for blooming mills, enables either homogeneous steel or compound ingots to be produced and may be applied to the manufacture of all kinds of material. Many changes may be made in the form and arrangement of the molds, pouring molds, etc., without departing from my invention.

I claim:

1. The method of forming billets or shapes for further work, consisting in pouring steel through a fused superheated non-metallic layer into a mold of greater width than depth and upon a bottom chill, progressively freezing the metal upwardly from the bottom, and then quickly removing the mold and shearing the casting into a series of sections at the initial heat, substantially as described.

2. The method consisting in pouring steel against a spreader plate or other spreading device and thereby spreading it over a bottom chill, freezing the metal progressively upward from the bottom while maintaining a floating layer of superheated non-metallic material on the steel, and then removing the casting and shearing it into sections at its initial heat, substantially as described.

3. The method of making billets or shapes for further work, consisting in casting a steel ingot of greater horizontal dimensions than depth, progressively freezing the same from the bottom upward and thereby preventing piping and segregation, and then at the initial heat shearing the same into a series of sections for further work thereon; substantially as described.

4. The method of forming billets or shapes for further work, consisting in casting a steel ingot of greater horizontal dimensions than depth by pouring steel against a removable spreader plate and uniformly spreading it over a bottom chill, freezing the ingot progressively from the bottom upwardly and thereby preventing piping and segregation, quickly removing the mold, and shearing the ingot at the initial heat into a series of sections; substantially as described.

5. The method of making castings, consisting in pouring molten steel into a mold of greater horizontal dimensions than depth and in spreading the metal uniformly over a bottom chill by means of a removable refractory spreader plate or plates, and freezing the ingot progressively from the bottom upward; substantially as described.

6. The method of forming billets or shapes for further work, consisting in casting a steel ingot of greater horizontal dimensions than depth by spreading the molten metal uniformly over a bottom chill, freezing the ingot progressively from the bottom upward, maintaining the top of the poured metal in a fluid condition by means of a fused superheated non-metallic layer, and then quickly removing the mold and shearing the casting into a series of sections at the initial heat; substantially as described.

7. The method of making castings, consisting in pouring and uniformly distributing molten steel over a bottom chill, progressively freezing the metal upwardly from the bottom and thereby preventing piping and segregation, and maintaining the top of the casting in a fluid condition by means of a fused superheated non-metallic layer; substantially as described.

8. The method of making castings, consisting in casting a steel ingot of greater horizontal dimensions than depth by pouring molten metal into a mold having a steel bottom chill, chilling it therein at the bottom more rapidly than at the sides and top, and maintaining a fused protective layer upon the surface of the metal from at least near the beginning of the pour throughout the same; substantially as described.

9. The method of making castings, consisting in casting a steel ingot of greater horizontal dimensions than depth by pouring molten metal into a mold having a steel bottom chill, chilling or solidifying it therein more rapidly at the bottom than at the sides and top, and maintaining a superheated fused protective layer upon the surface of the metal from at least the beginning of the pour throughout the same, and thereby maintaining the top of the casting in a fluid condition while more metal is being poured, and preserving the heat of the fused layer by a superposed layer of carbonaceous material; substantially as described.

In testimony whereof, I have hereunto set my hand.

JACOB K. GRIFFITH.

Witnesses:
W. C. Lyon,
H. M. Corwin.